United States Patent Office 3,772,219
Patented Nov. 13, 1973

3,772,219
FLEXIBLE POLYURETHANE FOAM COMPOSITION
Irving L. Schwarz, 42 Nickerson Road,
Newton, Mass. 02158
No Drawing. Filed Jan. 19, 1972, Ser. No. 219,163
Int. Cl. C08g 22/44
U.S. Cl. 260—2.5 AK                2 Claims

ABSTRACT OF THE DISCLOSURE

A polyurethane foam composition is afforded which may economically be used as a substitute for polyurethane foam scrap in the manufacture of rebonded polyurethane foam products. The polyurthane foam composition has uniformly dispersed therein from about 100% to about 200%, based on the weight of the polyol content of the foamed polyurethane, of pulverulent limestone, the average particle diameter of which is from about 5 to about 100 microns. The resulting foam composition conforms to that which is required for the aforesaid purpose in that it has a density of from about 2.25 to about 3.75 lbs./cu. ft. combined with an indentation load deflection value of about 55 to about 100 lbs. It also has a tensile strength of about 8 to about 14 lbs./sq. in. and a tear strength of about 0.5 to about 1.5 lbs./in.

FIELD OF THE INVENTION

This invention relates to polyurethane foams and foam compositions and relates more especially to polyurethane foam composition which can be economically produced with properties such that they may be used as a substitute for scrap foam trimmings in the manufacture of rebonded polyurethane foam products.

In the manufacture of prime polyurethane foam products approximately 20–25% of the foam initially produced ends up as trimmings or waste. The bulk of the polyurethane foam that is produced commercially is produced by a continuous process wherein the mixed ingredients are deposited on a moving supporting mold on which the foaming occurs to produce a foam in the form an an elongated loaf or bun. The crust, sides, bottoms and tops of the loaf are unusable in mattresses and other cushioning materials and hence have to be discarded. A certain amount of waste also is produced as the result of cutting the foam to desired dimensions. Originally the scrap trimmings after shredding or grinding were used principally as stuffings for pillows and toys and because of the large supply of scrap in relation to the limited demand the price of the scrap trimmings varied from giveaway to about 12¢ per pound. In recent years scrap trimmings have been salvaged by disintegrating the foam into small particles approximately ⅜ inch and bonding the particles togehter using as the bonding agent an uncured or partially cured polyurethane resin which constitutes from 8–15% by weight of the finished product. The particles to which the bonding resin has been applied are usually compressed to approximately half their original volume and while the mass is so compressed the bonding resin is cured under heat at a temperature which may be of the order of 190° F. The polyurethane resin that is used as a binder may be generally similar to the resin matrix of conventional produced polyurethane foam either of the polyester type or of the polyether type, the curing being assisted by the presence of a catalyst and water. Rebonded polyurethane foam may be initially produced in various forms such as cylinders, blocks or continuous slabs and useful products are produced therefrom by slicing or other cutting to desired dimensions. The resulting rebonded polyurethane foam products have desirable properties such that there is a large commercial demand therefor. The principal use for such material is as a carpet cushioning or underlay.

The present demand for rebonded polyurethane foam is so great as to far exceed the supply. As a consequence, the selling price of the scrap foam has increased until at the present time the price of scrap is in the range from 17–20¢ per pound. However, even at these prices there is not enough scrap to keep pace with the demand. The shortage of a suitable resin material has resulted in enforced periods of idleness of manufacturing facilities for producing rebonded foam scrap notwithstanding the fact that the demand is so great as to justify the expansion of existing facilities if suitable raw material were available at a sufficently low cost. Since the cost of the chemical components which make up ordinary polyurethane foam formulations is approximately 23–25¢ per pound, it has heretofore been regarded as uneconomical and, therefore, unfeasible to manufacture foam to be used as the raw material in the manufacture of rebonded polyurethane foam products.

The cost per pound of the polyurethane foam may be reduced by the inclusion in the foam of a mineral filler since the cost per pound of the filler is substantially less than that of the chemical components and since the amount of filler may be as much as 100% to 200% based on the weight of the polyol that is used in making the foam. More specifically, by the inclusion of such an amount of filler the density of a polyurethane foam having a density of about 1.5 to 2.0 lbs./cu. ft. may be increased so as to be of the order of 3 to 4 lbs./cu. ft. This density would be appropriate for foam to be used as a substitute for product since in the production of a bonded scrap product conventional foam having a density of about 1.5 to 2.0 lbs./cu. ft. may be compressed to about 50% of its original volume. However, the filled foams heretofore proposed have been too soft, namely, have had too low an indentation load deflection value. This value is determined using a piece of foam measuring 15" x 15" x 4" by depressing it using an 8" diameter platen. The indentation load deflection value is the number of pounds required to accomplish 25% compression of the foam while at room temperature. It is referred to hereinafter in the interest of brevity as "ILD." The ILD value of the filled foams which have previously been proposed is in the general range from 30 to 45 lbs. However, in order to be useful as an economical substitute for conventional polyurethane scrap the ILD value must be in the range from 55 to 100 lbs. and preferably in the range from about 75 to 90 lbs.

More specifically, in Pat. No. 3,298,976 it has been proposed to produce a polyurethane foam composition containing about 50 to about 150 parts of finely-divided particles of barytes per 100 parts of polyol used in the manufacture of foams. As exemplified in this patent, a typical foam so produced had an average specific gravity of 4.2 lbs./cu. ft. However, while the foam disclosed in said patent is useful for the purposes contemplated therein, the ILD value of such a foam based on barytes is too low for use in making rebonded foam products, as will be illustrated hereinbelow. The density of barytes is quite high, namely, about 4.5, and if attempt is made to increase the ILD value of the foam composition by subjecting the foam to compression, the density of the foam is concomitantly increased and becomes excessive.

In Pat. No. 3,598,772 it is proposed to employ finely particulate sand as a filler for a polyurethane foam. According to the disclosure in this patent, sand may be employed in the range from 75 to 200 weight percent, based on the weight of the polyurethane content of the foam. In this case also the resulting foam is satisfactory as to density and, while it is useful for other purposes as set forth in this patent, it is deficient in its ILD value for use as a substitute for scrap in the manufacture of rebonded foam products. Moreover, the sand filler is so excessively abrasive on shredding and cutting equipment as to preclude its use.

The density of a filled foam can be reduced to a small extent by the employment of a large amount of water in the foam formulation such as 5 to 6 parts of water per 100 parts of the polyol used in the formulation. However, if this is done the amount of the isocyanate, such as toluene diisocyanate, required to react therewith is greatly increased. Since the isocyanate is the most costly component of the foamed composition, the resulting increase in cost is inconsistent with the use of the resulting foam as a substitute for scrap polyurethane foam. It also is possible to reduce somewhat the density of a filled foam which employs the amount of water conventionally employed, namely, about 4 parts to about 100 parts of polyol, by introducing an auxiliary blowing agent such as Freon or methylene chloride. However, when auxiliary blowing agents such as these are added the cost per pound of the formulation is excessively increased and, in addition, the use of such agents tends to soften the foam substantially with a result which is inconsistent with either obtaining a low cost foam or obtaining a foam having a sufficiently high ILD value.

GENERAL STATEMENT OF THE INVENTION

It has been found according to this invention that a specific type of mineral filler, namely, pulverulent limestone, may be employed to produce a low cost polyurethane foam composition which can be used directly as a substitute for the conventional polyurethane foam scrap. The pulverulent limestone filler must be in the particle size range such that the average diameter is about 5 to about 100 microns. It has been found that when the pulverulent limestone filler is in this particle size range and is used in an amount so as to constitute from about 100 to about 200 parts on the weight of the polyol content of the polyurethane resin component of the foam composition a foam composition can be produced such that its density is within the required range from about 2.25 to 3.75 lbs./cu. ft. while at the same time the ILD value is in the range that is required, namely, from about 55 to about 100 lbs. When the average particle size of the limestone filler particles exceeds about 100 microns, then the foam composition becomes excessively soft in a manner comparable to that which occurs in the case of previously proposed polyurethane foam compositions containing a filler. At the other extreme, if the average particle size is less than about 5 microns mixing difficulties are encountered such that a satisfactory foam cannot be produced. It is surprising, therefore, that this particular filler within the limits of particle size above mentioned enables a polyurethane foam composition to be produced which has an ILD in the required range from 55 to 100 lbs. when the density is in the range from 2.25 to 3.75 lbs./cu. ft. so that the foam composition may be economically used in the manufacture of rebonded polyurethane foam products.

It also has been found that when a polyurethane foam composition having the required properties for density and a high ILD value is obtained by the use of pulverulent limestone in the amount and having the average particle size range hereinabove mentioned the resulting foam has desirable physical properties. Thus the tensile strength of the foam composition is in the range from 8 to 14 lbs./sq. ft. and tear resistance is from about 0.5 to 1.5 lbs./in.

The pulverulent limestone that is employed in the practice of this invention may vary somewhat as regards the presence of small amounts of other minerals such as the oxides of silicon, iron and aluminum. Preferably the content of any such oxide is low, namely, of the order of one or two percent. In addition to calcium carbonate, limestone usually contains some magnesium carbonate. In some limestone products the amount of magnesium carbonate may be around four or five percent. In other limestone products of the dolomitic type the content of magnesium carbonate may be comparable to the content of calcium carbonate and the term "limestone filler" as used herein and in the claims includes limestone of the dolomitic type as well as limestone which consists of calcium carbonate to the extent of about ninety to ninety-five percent.

The polyurethane foam in which the limestone filler is dispersed may be any conventional lightweight flexible resilient polyurethane foam, namely, a foam the specific gravity of which in the absence of the filler is of the order of 1 to 2 lbs./cu. ft., the ILD being from about 25 to 45 lbs. The composition and production of such foams is well known in the art. In the practice of this invention the particular formulation that is employed is less significant than in the manufacture of a prime unfilled flexible polyurethane foam inasmuch as the occurrence of flaws in the foam which would adversely affect the market value of a conventional foam are immaterial because the foam produced in the practice of this invention is intended to be shredded into small pieces used in the manufacture of rebonded foam. Generally speaking, such flexible polyurethane foams are produced by the reaction of a polyisocyanate with a long chain substantially linear polyhydroxy compound in the presence of a catalyst. The polyols which are preferred in the practice of this invention are polyalkylene ether polyols which are commonly referred to as polyethers and which are the reaction products of alkylene diamines such as ethylene diamine or polyhydroxy compounds such as glycerine or trimethylol propane with alkylene ethers such as ethylene oxides, propylene oxides or mixtures thereof. Such polyols may be represented by the general formula $HO(RO)_nH$ in which R stands for an alkylene radical and $n$ is any integer greater than 1. The polyols usually are derived from the polymerization of a cyclic ether such as an alkylene oxide or a dioxolane or from the condensation of glycols.

Another class of suitable polyols that may be used is that of saturated polyesters having terminal hydroxyl groups and low acid numbers. Such polyesters are made from a dibasic acid such as adipic acid or succinic acid and a dihydric alcohol such as ethylene glycol or propylene glycol. Other polyols may also be used provided that they are capable of forming a lightweight flexible polyurethane foam. However, it is preferable that at least the major proportion of the polyol be of the polyether type.

The polyol preferably has a molecular weight of the order of 3000 to 3500, although the molecular weight may vary considerably in the range from about 2000 to about 4000. Suitable polyols which may be employed in the practice of the invention are exemplified by triols having a molecular weight of about 3000 and diols having a molecular weight of about 2000.

The polyisocyanate which is employed normally is toluene diisocyanate, which may be 2,4-toluene diisocyanate or 2,6-toluene diisocyanate or a mixture thereof depending on the properties which are desired in the foam. In addition to toluene diisocyanate there are numerous other polyisocyanates which may be employed and which ordinarily contain two, or may contain three, functional isocyanato groups. Examples of other polyisocyanates are the diisocyanates such as hexamethylene diisocyanate; para-phenylene diisocyanate; 4,4'-diphenylene diisocyanate; 1,5-naphthylene diisocyanate; 4,4'-diphenylene methane diisocyanate; the tolylene diisocyanates; 4,4'-diphenyl ethyl diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane diisocyanate; and toluene 2,4,6 triisocyanate; the tetraisocyanates such as 4,4'-dimethyl-diphenyl methane 2,2', 5,5' tetraisocyanate and mixtures of polyisocyanates such as those described in U.S. Pat. No. 2,683,730. Of these 3,3'-dimethyl 4,4'-diphenyl diisocyanate and 3,3-dimethoxy 4,4'-diphenyl diisocyanate are particularly preferred.

The polyisocyanate reacts with the functional groups of the polyol. It also reacts with water that also is present with the formation of carbon dioxide gas which serves as a blowing agent in the production of the foam. The polyisocyanate usually is employed in excess of that which is required to react with all of the functional groups of the polyol and to also react completely with the water that is used so as to improve the properties of the resulting polymer complex by the formation in the polymer complex of not only urethane linkages but also others, including amide and biuret linkages. In order that the required physical properties may be obtained it is important that the water which is present be from about 3 to about 5 parts per 100 parts by weight of the polyol, the preferred amount of water being 4 parts per 100 parts of the polyol.

In the commercial production of polyurethane foam the reaction between the polyol and the diisocyanate is catalyzed by the presence of a catalyst either of the metallo-organic type such as stannous octoate or of the polyamine type such as triamines or tetramines or a mixture thereof. In addition, there are other catalysts known in the art which may be used. Normally a surfactant is present in order to assist in the development of a foam having uniform porosity. The surfactant which is most generally employed is a silicone such as alkyl silicone-polyoxyalkylene copolymer which is obtainable from the Silicones Division of Union Carbide Corporation under the trade designation "L-520."

In the practice of this invention the foam composition may be prepared by any of the methods conventionally employed in the manufacture of polyurethane foam. The three principal methods of foam preparation are the one-shot method, the prepolymer method and the quasi-prepolymer method. In the one-shot method the various foam components are rapidly mixed simultaneously to form a reaction mixture which is immediately deposited on a mold with concomitant initiation of the reaction that results in the formation of the foam. According to the prepolymer method, the polyol is mixed with the polyisocyanate, the polyisocyanate usually being in excess, and they are permitted to react to form a prepolymer suitable for subsequent thorough mixing with the water, the catalyst and the surfactant. According to the quasi-prepolymer method, the polyisocyanate is reacted with only a part of the polyol so as to result in a relatively low viscosity low molecular weight polymer dissolved in a large excess of the polyisocyanate. The foaming is brought about by thereafter reacting the quasi-prepolymer with the rest of the polyol and with the water, surfactant and catalyst.

In the practice of this invention the limestone filler is thoroughly mixed with the polyol and the polyol containing the limestone filler thoroughly dispersed therein is employed in the manufacture of foam according to the known procedures and except for the fact that the polyol contains the limestone filler dispersed therein.

DETAILED DESCRIPTION

In the following tabulation, Examples B and C are illustrative of foam compositions formulated in accordance with this invention. The formulation of Example A is that of Examples B and C except that the filler is omitted. Examples G and H likewise are formulated in accordance with this invention and serve to illustrate the effect of changing the amount of water that is contained in the formulation as compared with Example B. Examples D, E and F are identical with Examples B and C except for the substitution of a filler other than the limestone filler hereinabove defined, the use of which is critical to the attainment of the benefit of this invention. The components are given in parts by weight.

| Component | A | B | C | D | E | F | G | H |
|---|---|---|---|---|---|---|---|---|
| Polyol | 100 | 100 | 100 | 100 | 100 | 100 | 100 | 100 |
| TDI | 52 | 52 | 52 | 52 | 52 | 52 | 52 | 52 |
| Water | 4.0 | 4.0 | 4.0 | 4.0 | 4.0 | 4.0 | 3.0 | 5.0 |
| Silicone | 1.0 | 1.0 | 1.0 | 1.0 | 1.0 | 1.0 | 1.0 | 1.0 |
| Triethylenediamine | 0.3 | 0.3 | 0.3 | 0.3 | 0.3 | 0.3 | 0.3 | 0.3 |
| Stannous octoate | 0.3 | 0.3 | 0.3 | 0.3 | 0.3 | 0.3 | 0.3 | 0.3 |
| Limestone 16μ | | 150 | | | | | 150 | 150 |
| Limestone 30μ | | | 150 | | | | | |
| Limestone 130μ | | | | 150 | | | | |
| Barytes 5μ | | | | | 150 | | | |
| Silica 140μ | | | | | | 150 | | |

In the foregoing formulation the polyol which was used was a polyether that is sold by Union Carbide under the trade name Nyax 16-46. Its molecular weight is about 3500, its hydroxyl number is of the order of 45.8 to 48.8 mg. KOH/gm. and its viscosity is approximately 600 cps. at 25° C. It is believed to be a triol which is the reaction product of glycerin, propylene oxide and ethylene oxide. In each instance the indicated particle size of the filler is the average particle size in microns. Each of the limestone fillers had a specific gravity of 2.71. They consisted of calcium carbonate containing a small quantity of magnesium carbonate and very small quantities of other minerals. The specific gravity of the barytes was 4.5 and that of the silica was 3.5. The TDI was an 80:20 blend of 2,4 and 2,6 toluene diisocyanates.

The foam was produced by thoroughly dispersing the filler in the polyol. The remaining components thereafter were rapidly and thoroughly mixed with the polyol containing the premixed filler. The mixed components were placed in a mold and permitted to foam up. After having been permitted to cure for 8 hours at its exothermic temperature, which may reach 290° F., the foam compositions when tested were found to have the following physical properties:

PHYSICAL PROPERTIES

| Properties | A | B | C | D | E | F | G | H |
|---|---|---|---|---|---|---|---|---|
| Density, lbs./cu. ft. | 1.55 | 3.10 | 2.95 | 3.05 | 3.07 | 3.15 | 3.32 | 2.75 |
| Tensile strength, p.s.i. | 15.0 | 8.60 | 8.1 | 9.85 | 8.10 | 9.10 | 8.10 | 9.20 |
| Tear strength, lbs./in. | 2.1 | 1.64 | 1.30 | 2.30 | 1.44 | 1.82 | 1.42 | 1.38 |
| ILD | 40 | 74 | 74 | 23 | 44 | 32 | 95 | 73 |

The tests for determining density, tensile strength and tear strength as given above were performed in accordance with the methods prepared jointly by the American Society for Testing Materials and the Society of the Plastics Industry and described in "Tentative Methods of Test for Flexible Polyurethane Foam" ATM Designation D1564-637.

Having reference to the foregoing data, Examples B, C, G and H illustrate the effect of the limestone filler of proper particle size in increasing the density of the foam produced without the filler, namely, 1.55 lbs./cu. ft. so that it became within the range from 2.75 to 3.32, which is the optimum for usage as a substitute for scrap polyurethane foam. It also is highly important that the ILD value became increased from 40 lbs. so as to be of the order of 73 to 95 lbs. which, again, is optimum for a polyurethane foam composition which can economically be used as a substitute for scrap polyurethane foam. These ILD values are to be contrasted with 23 lbs. when the average particle size of the limestone filler was too large, namely, 130 microns (Example D), with 44 when barytes was employed (Example E) and with 32 when sand was employed (Example F). The latter foams are too soft for use as a substitute for scrap polyurethane foam. Examples B, G and H illustrate the effect of a change in the amount of water that is used on the ILD value and on density. The foregoing data also is noteworthy in providing a demonstration that notwithstanding the presence of the relatively large quantity of limestone filler in Examples B, C, G and H there was little adverse effect either on tensile strength or on tear strength.

In preferred practice of this invention the limestone filler consists essentially of calcium carbonate except for the presence of up to about 5% of magnesium carbonate and the average particle size of the limestone filler is from about 5 to 50 microns. Preferably it constitutes from about 125 to about 175 parts on the weight of the polyurethane resin component of the foam, namely, the weight of the product of the polymeric resin-forming reaction which results in the resin matrix of the foam composition in which the limestone filler is uniformly dispersed. The preferred ILD of the finished foam composition is from about 60 to about 90 pounds. Preferably the tensile strength is from about 11 to 12 lbs./sq. ft. and the tear strength is from about 0.8 to about 1.2 lbs./in.

I claim:

1. A flexible polyurethane foam composition suitable for the production of rebonded polyurethane foam carpet cushioning which comprises flexible foamed polyurethane which contains the reaction product between a polyol and a polyisocyanate and which has uniformly dispersed therein from about 100% to about 200%, based on the weight of the polyol content of said polyurethane, of pulverulent limestone the average particle diameter of which is from about 5 to about 100 microns, said composition having a density of from about 2.25 to about 3.75 lbs./cu. ft., an indentation load deflection value of about 55 to about 100 pounds, a tensile strength of about 8 to about 14 lbs./sq. in. and a tear strength of about 0.5 to about 1.5 lbs./in.

2. The flexible polyurethane foam composition according to claim 1 wherein the average particle size of the limestone filler is from 5 to 50 microns, and wherein the ILD is from about 65 to about 90 pounds.

References Cited
UNITED STATES PATENTS 3,441,523  4/1969  Dwyer et al. _____ 260—37 N MAURICE J. WELSH, JR., Primary Examiner U.S. Cl. X.R.

260—37 N

UNITED STATES PATENT OFFICE
CERTIFICATE OF CORRECTION

Patent No. 3,772,219      Dated Nov. 13, 1973

Inventor(s) Irving L. Schwarz

It is certified that error appears in the above-identified patent and that said Letters Patent are hereby corrected as shown below:

Col. 1, line 63, delete "conventional" and substitute --conventionally--.

Col. 2, line 31, delete "product" and substitute --scrap--.

Col. 3, line 53, delete "of" and substitute --for--.

Signed and sealed this 10th day of September 1974.

(SEAL)
Attest:

McCOY M. GIBSON, JR.
Attesting Officer

C. MARSHALL DANN
Commissioner of Patents